United States Patent [19]

Ishiai et al.

[11] 3,853,652

[45] Dec. 10, 1974

[54] PROCESS FOR PREPARATION OF SLATES OF SANDWICH ARRANGEMENT

[75] Inventors: Tamio Ishiai; Koji Aigami; Tasako Nishii; Masahiro Saito, all of Wakayama, Japan

[73] Assignee: Kao Soap Co., Ltd., Chuo-ku, Tokyo, Japan

[22] Filed: Feb. 15, 1973

[21] Appl. No.: 332,585

[30] Foreign Application Priority Data

Feb. 16, 1972   Japan.............................. 47-16297

[52] U.S. Cl.................. 156/79, 156/331, 161/161, 161/190, 264/45, 264/DIG. 17
[51] Int. Cl.............................................. B32b 5/18
[58] Field of Search ........ 156/78, 79, 331; 161/161, 161/190, 159, 160; 264/45, DIG. 17; 52/615

[56] References Cited
UNITED STATES PATENTS
3,684,598   8/1972   Gilbert................................. 156/79
3,689,348   9/1972   Peille................................... 156/79

Primary Examiner—Daniel J. Fritsch
Assistant Examiner—Neal Kalishman
Attorney, Agent, or Firm—Woodhams, Blanchard & Flynn

[57] ABSTRACT

A novel process for the preparation of slates of a sandwich arrangement is provided, which comprises coating a polyurethane prepolymer compound solution formed by incorporating a water-conductive agent such as powders of asbestos and hydrophilic fiber powder into a polyurethane prepolymer having terminal isocyanate groups, on an unhardened raw slate containing water, piling another raw slate on the coated layer, and then effecting the foaming and hardening of the polyurethane prepolymer.

10 Claims, No Drawings

PROCESS FOR PREPARATION OF SLATES OF SANDWICH ARRANGEMENT

BACKGROUND OF THE INVENTION

1. Field of the Invention

This invention relates to a novel process for the preparation of slates of a sandwich arrangement. More particularly, the invention provides a process for preparing slates of a sandwich arrangement which comprises coating a specific compound solution containing a polyurethane prepolymer on an unhardened raw slate containing water, piling another raw slate on the coated layer, forming a polyurethane foam layer by utilizing the foaming reaction between water contained in these raw slates and free isocyanate groups in the polyurethane prepolymer, and then causing the resin-forming reaction by the heat generated at the slate-hardening reaction to obtain a slate of a sandwich arrangement having an intermediate polyurethane foam layer.

2. Description of the Prior Art

In the conventional process for the preparation of slates of a sandwich arrangement having an intermediate foam layer, in the case of, for instance, slates of a sandwich arrangement having an intermediate polyurethane foam layer, such polyurethane foam layer is formed on the substrate slate by the one shot process or the froth process, or a polyurethane foam layer formed in advance by foaming is bonded to the slate substrate with use of an adhesive or by the heat-laminating process.

Further, when polyethylene foam, polystyrene foam, glass wool and the like are used as an intermediate layer for forming slates of a sandwich arrangement, the bonding of the intermediate layer is accomplished with use of adhesives in most cases.

These conventional processes, however, are defective in that tough tools should be used for controlling the foaming pressure and there are required many steps for application of an adhesive, bonding of an intermediate layer to the substrate and other operations.

In order to avoid such difficulties, it has been suggested to prepare slates of a sandwich arrangement by employing hardened and dried slates. In this method, slates of a sandwich arrangement can be obtained with relative ease, but it takes such a long time as 5 to 10 minutes to prepare one sheet of a slate sandwich arrangement. In contrast, in the method employing a raw slate containing water in such a great amount as 40 percent, because of the softness and fragility of the raw material, its handling involves great difficulties.

For instance, in case slates of a sandwich arrangement are prepared by forming a polyurethane foam on a raw slate according to the one shot process or the froth process, cracks are formed in the soft and fragile raw slate by the polyurethane-forming pressure and the polyurethane foam leaks out from such cracks, with the consequence that the resulting slates cannot be put into practical use. Further, it is very difficult to obtain slates of a sandwich arrangement by bonding a layer of polyethylene foam, polystyrene foam, glass wool of polyurethane foam formed in advance by foaming to a soft and fragile raw slate with use of an adhesive, because the bonding operation involves difficulties. In addition, since raw slates are usually manufactured at such a high rate as one sheet per 10 seconds, it is practically impossible to effect the bonding of a foam layer to a raw slate at a rate corresponding to such high slate-manufacturing rate.

SUMMARY OF THE INVENTION

A primary object of this invention is to provid a novel process for the preparation of slates of a sandwich arrangement which can overcome such defects and difficulties involved in the conventional techniques and can produce slates of a sandwich arrangement containing an intermediate polyurethane foam layer even with use of a raw slate, and the gist of this invention resides in a process for the preparation of slates of a sandwich arrangement, characterized by coating a polyurethane prepolymer compound solution formed by incorporating a water-conductive agent such as asbestos and the hydrophilic fiber powder into a polyurethane prepolymer having terminal isocyanate groups, on an unhardened raw slate containing water, piling another raw slate on the coated solution, and then effecting the foaming and hardening of the polyurethane prepolymer.

In the customary prepolymer method, water (in air) and heat are intentionally added from the exterior in order to advance the foaming reaction and resin-forming reaction. However, in the process of this invention for preparing slates of a sandwich arrangement, during the step of forming a polyurethane foam layer, the foaming reaction is caused between water contained in the raw slate (in the range of 15 to 45 percent by weight, usually about 40 percent by weight) and free isocyanate groups in the polyurethane prepolymer and, subsequently, the resin-forming reaction is allowed to advance by heat generated at the hardening of the raw slate.

As described above, in the process of this invention, water or heat need not be supplied intentionally from the exterior and, by changing the properties of the polyurethane prepolymer, it is made possible to prepare a polyurethane foam layer of desired properties, for instance, rigid foam layer, a semi-rigid foam layer or a soft foam layer. Further, this invention is advantageous in that slates of a sandwich arrangement can be prepared easily and promptly in succession to the raw slate-manufacturing step without disturbing such a high raw slate-manufacturing rate as one sheet per 10 seconds.

This invention will now be illustrated in more details.

The term "compound solution" is used herein to mean a compound solution having a suitable viscosity, which is formed by simultaneously adding a water-conductive agent and, if necessary or desirable, a foam-adjusting agent, a colorant, a filler and other additive to a polyurethane prepolymer containing free isocyanate groups and kneading the blend. In the process of this invention, at first a catalyst such as an amine catalyst and a metal catalyst is added to this compound solution and the mixture is agitated. Then, the solution is extruded on an unhardened raw slate and extended thereon by means of a coater. As such additives as foam-adjusting agent, colorant and filler, conventional additives to the polyurethane prepolymer can be used, as desired.

Then, another raw slate is piled on the so coated compound solution. Thus, the compound solution having a flowability is slightly impregnated in, or sticked into, the raw slates. At this step, the piled raw slate is lightly pressed by a roll or the like according to need. The free or terminal isocyanate groups in the compound solution sandwiched between the raw slates reacts with water contained in the raw slates to effect the foaming, and the prepolymer is converted to a resinous foam product by an action of the heat generated at the hardening of the slates. It is preferred that the temperature is maintained at 50° to 120°C at this resin-forming reaction. In the so formed slate of a sandwich arrangement, the intermediate polyurethane foam layer is bonded tightly to the slate surface, and since water contained in the raw slates is conducted into the compound solution by the action of the water-conductive agent contained in the compound solution to cause the foaming reaction between the so conducted water and the free isocyanate groups, the intermediate polyurethane foam has a uniform structure.

After the occurrence of the above-mentioned steps, the intended product of this invention, namely a slate of a sandwich arrangement excellent in strength, heat-insulating property and other characteristics, can be obtained.

The polyurethane prepolymer to be used for formation of the compound solution employed in the process of this invention is one formed by reacting a polyol such as polyols of polyoxypropylene glycol and polyoxyethylene glycol with an excess amount of a polyfunctional isocyanate. The ratio of the polyol to the polyfunctional isocyanate is generally in the range of 5 to 8 equivalents of isocyanate radical (NCO) in the polyfunctional isocyanate to 1 equivalent of active hydrogen atom in the polyol.

As the polyol, a polyether polyol or polyester polyol is generally employed. The molecular weight and functionality of such polyol can be selected optionally and appropriately depending on the desired physical properties of the resulting polyurethane foam layer. It is possible to employ two or more of polyols in combination. As the polyfunctional isocyanate, there may be employed, for example, tolylene diisocyanate, diphenylmethane diisocyanate and a mixture of tolylene diisocyanate and diphenylmethane diisocyanate.

The water-conductive agent to be incorporated into the polyurethane prepolymer should take a fibrous form and be inactive to the polyurethane prepolymer chemically. It is also indispensable that the water-conductive agent should be excellent in the water-conductivity. Powders of asbestos, pulp flocks, hydrophilic synthetic or chemical fibers and the like are suitable as the water-conductive agent. It is preferred that such fibrous substance has an average size of 50 to 400 mesh, and it is especially preferable that the agent comprises particles having a size of 200 to 350 mesh at a certain content. The optimum amount of the waterconductive agent to be added to the polyurethane prepolymer is varied depending on the intended foam size in the polyurethane foam layer, the viscosity of the polyurethane prepolymer and the kind of the coating machine, but it is generally preferred that the water-conductive agent is incorporated in an amount of 2 to 10 parts by weight per 100 parts by weight of the polyurethane prepolymer.

When the compound solution formed by incorporating such water-conductive agent in the polyurethane prepolymer is coated at a thickness of 1 to 2 mm on a raw slate in a manner as described above, the agent conducts water of the raw slate to the free isocyanate groups contained in the compound solution, whereby the foaming reaction of the compound solution on the slate surface and the foaming reaction in the interior of the compound solution coated in a thickness of 1 to 2 mm can be caused without substantial difference of the time, namely substantially simultaneously. Thus, the water-conductive agent is very effective for making uniform the foam size between the surface area and the interior of the polyurethane foam layer.

Still further, the water-conductive agent incorporated in the polyurethane prepolymer, say, asbestos, pulp flock and the like, gives good results with respect to the strength and dimension stability of the polyurethane foam layer, in addition to the above-mentioned main effects.

This invention will now be illustrated by reference to Example and Comparative Examples, in which all of "parts" are "parts by weight."

EXAMPLE

A polyurethane prepolymer was formed by mixing 93.5 parts of polypropylene glycol having a molecular weight of 250 and 65.1 parts of polypropylene glycol having a molecular weight of 1500 with 420.6 parts of tolylene diisocyanate and 420.6 parts of diphenylmethane diisocyanate and reacting them at 85°C under agitation for 90 minutes.

A mixture of 5 parts of pulp flock (50 – 400 mesh, containing about 60 percent of pulp flock of 200 – 350 mesh) and 1 part of Silicone SH–190 (foam-adjusting agent) was blended under agitation into 100 parts of the so formed polyurethane prepolymer. Then, the resulting mixed solution was added with a mixture of 0.3 part of tetramethyl-hexamethylene diamine and 0.6 part of stannous octoate as a catalyst, and the mixture was blended under agitation to form a compound solution.

The so formed compound solution was uniformly cast in a thickness of 1.0 mm on a water-containing (about 40 percent), unhardened raw slate molded to have a length of 1,900 mm, a width of 98 mm and a thickness of 3 mm. Another sheet of a water-containing raw slate molded to have a length of 1,900 mm, a width of 98 mm and a thickness of 3 mm was placed on top of the solution on the first slate to form a sandwich. The sandwich was lightly pressed. Then, a spacer having a prescribed thickness was placed in association with the sandwich to limit the thickness of the foam layer to be formed. Then, the sandwich was placed in a chamber, where the foaming reaction and the resin-forming reaction were promoted by water contained in the slates and the heat spontaneously generated at the hardening of the slates. Since the thickness of the polyurethane foam was controlled to 5 mm by means of the spacer, it was possible to obtain a sandwiched polyurethane foam layer having uniform thickness of 5 mm. The so formed slate of a sandwich arrangement had the flexural strength and impact resistance improved by more than 20 percent over the conventional slate having no sandwiched polyurethane foam layer. Further, the product was excellent in heat-insulating property, weight lightness, volume characteristics and other properties.

Comparative Example 1

A compound solution was prepared in the same manner as in the above Example by employing, instead of 5 parts of pulp flock as the water-conductive agent, 25 parts of cyclohexanone. When preparation of a slate of a sandwich arrangement was intended in the same manner as in the above Example by employing the so formed compound solution and raw slate sheets, water of the raw slate was not conducted into the interior of the compound solution and, hence, the resulting polyurethane foam layer had coarse and inferior foams and the degree of the foaming was very low. Moreover, since the compound solution was sandwiched between the slates, gasified cyclohexanone could not escape from the compound solution layer, with the result that large voids were formed here and there in the resulting polyurethane foam layer.

Comparative Example 2

By employing a compound solution prepared in the same manner as in the above Example and hardened slates instead of unhardened raw slates, procedures of the above Example were repeated with a view to obtaining a slate having a sandwich structure. However, the foaming was hardly caused to occur. Only when the assembly was allowed to stand still for a very long period of time, a slightly foamed polyurethane layer was obtained but this polyurethane foam layer was easily peeled off from the slate surface without imposition of any particular force.

The embodiments of the invention in which an exclusive property or privilege is claimed are defined as follows:

1. In a process for preparing a sandwich arrangement of slates, the steps which comprise:

coating a polyurethane prepolymer compound solution formed by incorporating a water-conductive agent and catalyst into a polyurethane prepolymer having terminal isocyanate groups, on a first unhardened raw slate containing from 15 to 45 percent by weight of water; placing another unhardened raw slate containing from 15 to 45 percent by weight of water on top of the solution coated onto the first slate; and then effecting the foaming of the polyurethane prepolymer by conducting water from said slates into said solution by means of said water-conductive agent to react with said isocyanate groups to form a polyurethane foam layer sandwiched between said slates, and hardening the foam layer.

2. A process as claimed in claim 1, wherein said water-conductive agent is selected from powders of asbestos, pulp flocks and hydrophilic fiber powder.

3. A process as claimed in claim 1, wherein the average size of said water-conductive agent is 50 to 400 mesh.

4. A process as claimed in claim 1, wherein the water-conductive agent is incorporated in the amount of 2 to 10 parts by weight per 100 parts by weight of the polyurethane prepolymer.

5. A process as claimed in claim 1, wherein said polyurethane prepolymer having terminal isocyanate groups is a polyurethane prepolymer formed by reacting a polyol with an excess amount of a polyfunctional isocyanate.

6. A process as claimed in claim 5, wherein said polyol is selected from polyethyer polyol and polyester polyols.

7. A process as claimed in claim 5, wherein said polyfunctional isocyanate is selected from tolylene diisocyanate, diphenylmethane diisocyanate and mixtures thereof.

8. A process as claimed in claim 5, wherein the ratio of the polyol to the polyfunctional isocyanate is in the range of 5 to 8 equivalents of isocyanate radicals in the polyfunctional isocyanate to 1 equivalent of active hydrogen atoms in the polyol.

9. In a process for the manufacture of laminated articles consisting of a foamed polyurethane core sandwiched between and bonded to two outer sheets of slate, the steps which comprise: coating a surface of a first sheet of unhardened slate having a water content of from 15 to 45 percent by weight, with a polyurethane prepolymer compound solution formed by incorporating a nonreactive fibrous water-conductive agent and catalyst into a polyurethane prepolymer having terminal isocyanate groups; placing a second sheet of unhardened slate having a water content of from 15 to 45 percent by weight on top of the solution coated on the first sheet of slate; and then effecting foaming of the polyurethane prepolymer by conducting water from said slates into said solution by means of said water-conductive agent to react with said isocyanate groups to form a polyurethane foam; and hardening the foam to form a polyurethane foam layer sandwiched between said sheets of slate.

10. A process according to claim 9, in which said solution contains from 2 to 10 parts by weight, per 100 parts by weight of the polyurethane prepolymer, of said nonreactive fibrous water-conductive agent having an average size of 50 to 400 mesh and said solution is coated on said first sheet at a thickness of about 1 to 2 mm.

* * * * *